(12) United States Patent
Doherty et al.

(10) Patent No.: US 8,995,979 B2
(45) Date of Patent: Mar. 31, 2015

(54) MEID-BASED PAGING TO REACH DE-ACTIVATED TELEMATICS MODULES

(75) Inventors: James Doherty, Wyandotte, MI (US); Ki Hak Yi, Windsor (CA)

(73) Assignee: General Motors LLC, Detroit, MI (US)

(*) Notice: Subject to any disclaimer, the term of this patent is extended or adjusted under 35 U.S.C. 154(b) by 435 days.

(21) Appl. No.: 13/070,712

(22) Filed: Mar. 24, 2011

(65) Prior Publication Data

US 2012/0244850 A1 Sep. 27, 2012

(51) Int. Cl.
*H04M 3/00* (2006.01)
*H04L 29/08* (2006.01)
*H04L 29/12* (2006.01)
*H04W 4/02* (2009.01)
*H04W 4/04* (2009.01)

(52) U.S. Cl.
CPC ............. *H04L 67/12* (2013.01); *H04L 61/157* (2013.01); *H04L 61/2076* (2013.01); *H04L 61/609* (2013.01); *H04W 4/021* (2013.01); *H04W 4/046* (2013.01)
USPC ........................................................ 455/418

(58) Field of Classification Search
CPC .......... H04M 1/6075; H04M 3/42144; H04M 3/42272; H04W 8/18; H04W 8/24; H04W 4/08; H04W 84/027; H04W 8/26; H04W 4/021; H04W 4/046; H04W 76/02; G07C 5/008
USPC .................................................. 455/418–420
See application file for complete search history.

(56) References Cited

U.S. PATENT DOCUMENTS

| | | | |
|---|---|---|---|
| 2004/0101123 A1* | 5/2004 | Garcia ..................... | 379/220.01 |
| 2005/0186941 A1* | 8/2005 | Gault et al. .................... | 455/411 |
| 2006/0052092 A1* | 3/2006 | Schwinke et al. ............ | 455/415 |
| 2007/0254639 A1* | 11/2007 | Chmielewski et al. ........ | 455/419 |
| 2008/0143497 A1* | 6/2008 | Wasson et al. ............. | 340/425.5 |
| 2009/0036091 A1* | 2/2009 | Ball et al. .................... | 455/404.1 |
| 2009/0248236 A1* | 10/2009 | Schwinke ........................ | 701/33 |
| 2010/0255860 A1* | 10/2010 | Ji ................................. | 455/458 |
| 2011/0059734 A1* | 3/2011 | Dunne et al. .................. | 455/420 |

* cited by examiner

*Primary Examiner* — Liton Miah
(74) *Attorney, Agent, or Firm* — Anthony Luke Simon; Reising Ethington P.C.

(57) ABSTRACT

A method of operating a telematics unit includes replacing a mobile identification number (MIN) or a mobile dialed number (MDN) stored in a telematics unit with a temporary geographical mobile identification number (GMIN) that prevents the telematics unit from using all of its features; associating the GMIN with a mobile equipment identification number (MEID) of the vehicle telematics unit; storing the associated GMIN and MEID at a central facility; paging the telematics unit using the associated GMIN and MEID; and instructing the telematics unit via the page to communicate with the central facility over a wireless data connection.

20 Claims, 2 Drawing Sheets

MEID-BASED PAGING TO REACH DE-ACTIVATED TELEMATICS MODULES

TECHNICAL FIELD

The present invention relates generally to vehicles and more particularly to communication with telematics-equipped vehicles.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients, such as a central facility. The communications can be carried out as part of a wireless communication service, such as a telematics service subscription associated with a vehicle. When the vehicle is associated with a wireless communication service, that vehicle can wirelessly communicate with the central facility and others using a wireless carrier. However, when the wireless communication service is no longer active, such as when a vehicle owner cancels the service or fails to renew it, the wireless communications capabilities of the telematics unit in that vehicle may be deactivated. Even though the wireless communication capabilities may have been deactivated, some communication with the vehicle may still be desired. As a result, it may be helpful to be able to communicate with the vehicle even though the telematics unit has been deactivated.

SUMMARY OF THE INVENTION

According to an aspect of the invention, there is provided a method of operating a vehicle telematics unit. The method includes replacing a mobile identification number (MIN) or a mobile dialed number (MDN) stored in a telematics unit with a temporary geographical mobile identification number (GMIN) that prevents the telematics unit from using all of its features; associating the GMIN with a mobile equipment identification number (MEID) of the telematics unit; storing the associated GMIN and MEID at a central facility; paging the telematics unit using the associated GMIN and MEID; and instructing the telematics unit via the page to communicate with the central facility over a wireless data connection.

According to another aspect of the invention, there is provided a method of operating a vehicle telematics unit. The method includes determining that a wireless communication service has not been renewed for a vehicle having a telematics unit; identifying the location of the vehicle; associating a temporary geographic mobile identification number (GMIN) with a mobile equipment identification number (MEID) of the telematics unit based on the location of the vehicle; storing the associated GMIN and MEID at a central facility; wirelessly transmitting the GMIN to the vehicle; programming the telematics unit with the GMIN; and communicating with the telematics unit using the associated GMIN and MEID.

According to yet another aspect of the invention, there is provided a method of operating a vehicle telematics unit. The method includes determining a system identification number (SID) or a network identification number (NID) of a wireless carrier system at the location of a vehicle that includes a vehicle telematics unit; selecting a temporary geographical mobile identification number (GMIN) based on the SID or NID; replacing a mobile identification number (MIN) or mobile dialed number (MDN) of the telematics unit with the selected GMIN; associating the GMIN with a mobile equipment identification number (MEID) of the vehicle telematics unit; storing the associated GMIN and MEID at a central facility; if the vehicle detects that the SID or NID of the wireless carrier system at the location of the vehicle has changed, then: establishing a data connection via the wireless carrier system between the vehicle and the central facility; sending the SID or NID to the central facility; selecting a new GMIN based on the changed SID or NID sent to the central facility; programming the telematics unit with the new GMIN; associating the new GMIN with the MEID of the vehicle telematics unit; and storing the associated new GMIN and MEID at the central facility.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

The method described below uses the mobile equipment identifier (MEID) of a telematics unit and a temporary geographically-linked number stored at the unit to permit communication with a vehicle even though a telematics service subscription has been deactivated. The telematics unit generally uses a mobile identification number (MIN) or mobile dialed number (MDN) to communicate through a wireless carrier system when the unit is associated with an active telematics service subscription. However, when the telematics subscription service is deactivated or expires, the MIN or MDN can be erased from the telematics unit as part of the deactivation process. In the place of the MIN/MDN, a temporary number can be stored that allows the telematics unit some limited functionality. This temporary number can be a geographical mobile identification number (GMIN) that is assigned to the telematics unit based on its location. The GMIN can be location-based in the sense that a particular wireless network or particular location/geographic area can be assigned a unique GMIN. And depending on the location of the vehicle, the unique GMIN can be stored in place of the MIN/MDN. In this sense, a plurality of telematics units can store a single GMIN at the vehicle. In addition, a central facility can maintain a database of vehicle identifiers each representing a telematics unit, such as MEIDs, and the GMIN that has been stored at each telematics unit for future use. And when the central facility wants to contact any particular vehicle it can use an MEID-based paging system to contact the last location (e.g. particular network) of the vehicle. Using the GMIN, the central facility can determine the last location of the vehicle, send a query such as a shoulder tap to the network located at the last location—along with the MEID of the vehicle telematics unit—and the network can page the telematics unit with the sent MEID.

However, given that vehicles are mobile, it is helpful to update the list of telematics units (or their MEIDs) and the GMIN that is associated with each telematics unit with a new GMIN if the vehicle moves to a new location or network. That is, when a vehicle moves from one network to another it can be determined that a new GMIN should be saved at the vehicle depending on the identity of the new network. If the new network uses the same GMIN, the vehicle may not need a new GMIN. But if the new network uses a different GMIN than the network from which it moved, the vehicle can alert the central facility that it has moved and a new GMIN can be issued. The central facility can then provide a new GMIN for the telematics unit to store and record the new GMIN for that MEID at the central facility.

Figure 1:
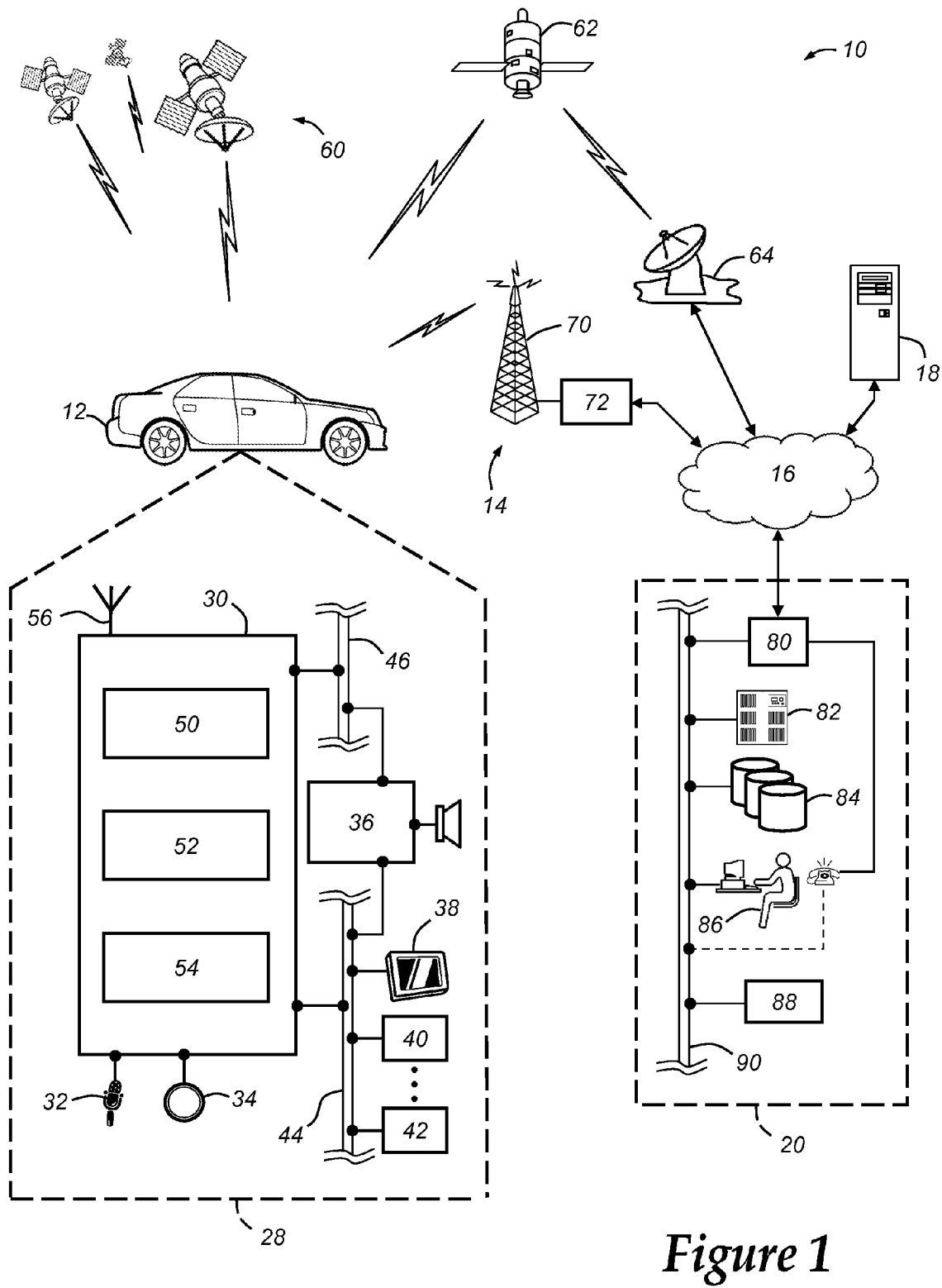
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), 1XRTT, 1XEVDO, GSM, GPRS, EDGE, WCDMA, and HSPA to name a few. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
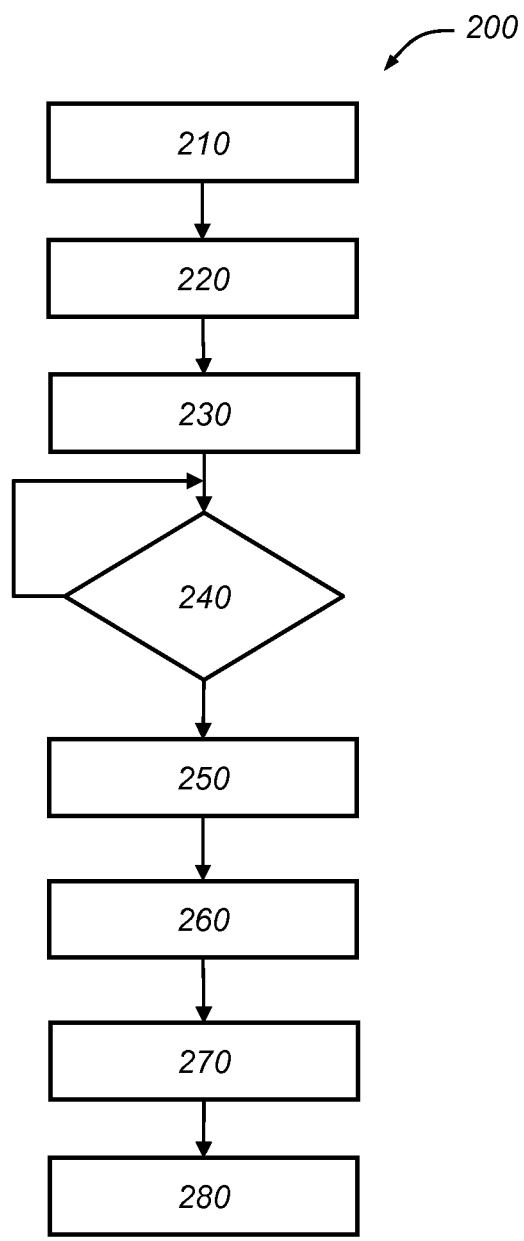
FIG. 2 is a flow chart of a method of communicating with a telematics unit.

Turning now to FIG. 2, there is shown a method of operating a vehicle telematics unit. The method 200 begins at step 210 by determining that a wireless communication service is being terminated or has expired and is not being renewed for a telematics unit of a vehicle. The wireless communication service, such as a telematics service subscription, is often provided for a term (e.g. monthly, yearly, etc.) and on or before the end of that term, the service can be cancelled, renewed, or not renewed. Referring also to FIG. 1, as is known, use of a cellular communication system 14 can involve a MIN/MDN associated with the telematics unit 30 which is used in directing calls to the vehicle. Termination of wireless service can involve eliminating this association in the cellular system so that calls using that MIN/MDN are no longer routed to the vehicle.

At step 220, once it has been determined that the telematics service is being terminated (e.g., canceled, not renewed, etc.), then the MIN/MDN is erased from the telematics unit and replaced with a temporary geographical mobile identity number (GMIN). As is known, when the telematics unit 30 is initially registered, it can be programmed with a MIN or a MDN. However, when the wireless communication service ends, the MIN/MDN can be erased or disassociated with the telematics unit 30 and the GMIN can be stored in its place. This can be carried out in a variety of ways. For example, the call center 20 or other entity that provides a telematics service portion of the wireless communication service can determine or receive notification that the wireless communication service has ended or should end and as a result instruct the wireless communication system 14 (e.g., a cellular service provider such as Verizon Wireless™) to end service to the vehicle by, for example, disassociating the MIN/MDN and the vehicle's telematics unit in the wireless communication system 14. In one embodiment, upon determining that service has or is to end, the call center 20 can instruct the telematics unit 30 over a data call to erase the MIN/MDN and replace it with a selected GMIN. Once done, the call center can then inform the wireless communication system 14 that the cellular service for that vehicle and its MIN/MDN should be terminated. In another example, the call center 20 can receive a notice from the vehicle owner or other person that the wireless communication service is no longer needed. This can be carried out from the vehicle 12 in which the vehicle owner/other person pushes a button 34 in the vehicle 12 which directs the telematics unit 30 to establish a call with the call center 20. Using that call, the vehicle owner/other person can convey to the call center 20, via voice or menu selection provided on display 38, that the wireless communication service is no longer wanted. The call center 20 can then have the MIN/MDN replaced with the selected GMIN and the cellular service discontinued. In some embodiments, this may be carried out by having the wireless communication system cause the replacement of the MIN/MDN with the GMIN at the vehicle, rather than by direct instruction from the call center. In yet other embodiments, the determination at step 210 that service is to terminate and the replacing of the MIN/MDN with a GMIN can all be carried out at and by the vehicle without being initiated from the call center 20 or wireless communication system 14. For example, it is possible to replace the MIN/MDN with a GMIN without exchanging data with the call center 20. In that case, a previously-stored mapping table that correlates each GMIN with one or more MIN/MDN pairs can be carried by the vehicle 12 and/or telematics unit 30. When the wireless communication service is no longer needed, the telematics unit 30 can identify the MIN/MDN local to the vehicle 12 and access the mapping table to obtain the GMIN that is associated with the local MIN/MDN. The obtained GMIN can then be stored at the vehicle 12.

The GMIN may provide limited functionality for the telematics unit 30. In one example of this limited functionality, the telematics unit 30 may not be able to place/receive telephone calls to/from outside callers, but still may be able to gather data and/or register with a local wireless carrier system 14 using the GMIN so that the home location register (HLR) or visitor location register (VLR) may recognize the vehicle.

In one example, the GMIN can be a 500-prefix (e.g. area code) number that is not typically assigned to be used in one area by the North American Numbering Plan (NANP), such as 500-XXX-XXXX or 533-XXX-XXXX. Rather, a 500-prefix number can be used at various locations within telecommunications systems that use the NANP. This way, the call center 20 can assign a 500-prefix number to a particular geographical area without being limited by the geographical constraints set out by the NANP. For instance, the NANP can use a Numbering Plan Area (NPA) to establish the area code in a particular area. As one example, the area code 313 is used in the Michigan cities of Dearborn, Detroit, and Detroit's inner enclaves of Hamtramck and Highland Park. And in another example, the area code 231 is used in northwest portion of the lower peninsula of Michigan. In contrast, a 500-prefix number can be used to represent a geographical area serviced by the 313 as well as the 231 area code (or any other area codes). Ultimately, the call center 20 can define a geographical area independent of the NANP/NPA and assign a particular 500-prefix number to use with a defined geographical area of its choosing. In one example of this, the state of Michigan can be assigned the 500-prefix number 500-000-0001. Therefore, regardless of the various area codes used throughout the state of Michigan, vehicles 12 that are located in the state of Michigan can be programmed with the 500-000-0001 number instead of the MIN/MDN.

The call center 20 can determine the location of the vehicle 12 in order to assign a particular 500-prefix number to the vehicle 12. This can be carried out in any one of a number of ways. For instance, the vehicle 12 can be directed to wirelessly send the call center 20 the GPS coordinates of its last position when the wireless communication service is cancelled or expires. In another example, call center 20 can use a billing address that was previously-recorded with the call center 20 or the wireless service provider. Either way, the call center 20 can determine at least the general location of the location of the vehicle 12 and assign a 500-prefix number based on that position. More particularly, the 500-prefix number can be assigned based on GPS coordinates identified when the MIN/MDN is erased from the telematics unit 30. That is, the telematics unit 30 can use instructions stored at the unit 30 that are executable by the processor 52 to determine that the MIN/MDN stored at the unit 30 is to be replaced. In response, the GPS coordinates can be obtained from the GPS module 40 and wirelessly transmitted to the call center 20 where they can be used to determine the appropriate 500-prefix number. Similarly, after determining the appropriate 500-prefix number, the call center 20 can assign that number to the vehicle 12, store it at the call center 20, and provide it to the vehicle for use in replacing the MIN/MDN. Thereafter, the telematics unit 30 can re-register with the cellular network 14. Other suitable methods of determining the general location of the vehicle and thus, the proper GMIN can be used. For example, this can be done based on the SID or NID of the base station that is being used to communicate with the vehicle at the time the reprogramming of the telematics unit with the GMIN is to occur. The method 200 proceeds to step 230.

At step 230, the GMIN is associated with the MEID of the telematics unit 30 and stored at the call center 20. Once the GMIN has been stored at the vehicle 12, the call center 20 can record the GMIN and the MEID for the vehicle 12 in which the GMIN has been saved. That way, the call center 20 can maintain a list of vehicles 12, the MEID of the telematics unit 30 carried by each vehicle 12, and/or the GMIN saved at each vehicle 12 or MEID. This list can be a searchable database that can be queried in a variety of ways. For example, if the call center 20 wants to identify all vehicles 12 that are located in Michigan, the database can be queried to do so. Using the above example involving a GMIN that represents the state of Michigan, the database could receive the number 500-000-0001 as a query and a list of all of the vehicles 12 and/or MEIDs that are using the 500-000-0001 number can be output. In another example, the database could be queried using the MEID of a particular vehicle 12. The database could then output the 500-prefix number saved at that vehicle 12. An MEID is a globally unique number identifying a physical piece of CDMA mobile station equipment, such as the telematics unit 30. And while this example is described in terms of the MEID and a CDMA wireless telephony system, this method 200 is equally applicable to other wireless telephony systems and mobile station identifiers. The method 200 proceeds to step 240.

At step 240, it is determined if the system identification code (SID) or the network identification code (NID) of the wireless carrier system 14 at the location of the vehicle 12 has changed. If not, step 240 can be repeated until a change is detected. The SID can be a code that is broadcast by a system, such as a wireless service provider (e.g. Verizon Wireless™) or wireless carrier system 14, whereas the NID can be a code that is broadcast by a portion of the system 14/wireless service provider that is in local communication with the vehicle 12, such as the cell tower 70 or the base station. The change can be detected at the vehicle; for example, the vehicle 12 can receive the SID and/or the NID broadcast from the wireless carrier system 14. When the SID/NID received by the vehicle 12 remains the same as the vehicle 12 moves, then step 240 can be repeated until a change is detected. In the example discussed above in which the vehicle 12 has the GMIN 500-000-0001 assigned for Michigan saved at the vehicle 12, when the vehicle 12 detects that the NID received locally has changed and that the NID indicates that the vehicle has left Michigan and has moved to, for example, Ohio, the vehicle 12 can determine that a new GMIN may be needed. Like the GMIN that can be created for vehicles 12 operating in Michigan, the vehicles 12 operating in Ohio can be programmed with a different/unique GMIN that can be, in this example, 500-000-0002. In another example, the HLR that services the GMIN stored in the telematics unit 30 can provide a periodic update of the last known pointer, such as the mobile switching code identification (MSC ID) or a signaling system #7 (SS7) point code of the VLR and can send these periodic updates to the call center 20 regarding the location of the vehicle 12. When the periodic update indicates that the vehicle 12 has moved outside of the area serviced by the presently-stored GMIN, the call center 20 can decide to change the GMIN stored at the vehicle 12. The method 200 proceeds to step 250.

At step 250, a data connection is established between the vehicle 12 and the call center 20 via the wireless carrier system 14 and the SID/NID is sent to the call center 20. Upon detecting that the vehicle 12 has moved into an area in which a different GMIN than the one presently stored at the vehicle 12 is used, the vehicle 12 can contact the call center 20 to request a new GMIN. This request can include wirelessly transmitting the most recently received SID/NID pair (or just the NID) from the vehicle 12 to the call center 20. The transmission can be triggered automatically at the telematics unit 30 when the received SID/NID pair tells the vehicle 12 that it has moved outside of the geographical range of the stored GMIN. Using the example above, this can occur when the vehicle 12 moves from Michigan to Ohio. The method 200 proceeds to step 260.

At step 260, a new GMIN is selected based on the change in SID/NID, the new GMIN is transmitted to the vehicle 12, and telematics unit 30 is programmed with the new GMIN. Once the SID/NID is received from the vehicle 12, the call center 20 can determine the appropriate GMIN that is used in the area where the vehicle 12 now operates based on the received SID/NID. This can be determined using a lookup table at the call center 20 that links SID/NID data with geographic location. Using the example above, this can occur when the vehicle 12 moves from Michigan to Ohio, where vehicles 12 that can be monitored using the method 200 may use the 500-000-0002 GMIN. While the vehicle 12 previously stored the Michigan GMIN 500-000-0001, it can now be stored with the Ohio GMIN 500-000-0002. To accomplish this, the call center 20 can wirelessly transmit the Ohio GMIN to the vehicle 12 located in Ohio. The telematics unit 30 can receive the new (Ohio) GMIN (500-000-0002) and replace the previously-stored Michigan GMIN (500-000-0001) by storing the new GMIN at the vehicle 12. In general, when the location or SID/NID received at the call center 20 does not match the location of the GMIN stored at the vehicle 12, a new GMIN can be selected, sent, and stored at the vehicle 12 as is described herein. The method 200 proceeds to step 270.

At step 270, the new GMIN is associated with the MEID of the telematics unit 30 and the new GMIN and the MEID are stored at the call center 20. Once the new GMIN has been selected and/or wirelessly transmitted to the vehicle 12, the call center 20 can associate the new GMIN with the vehicle 12 using the MEID or other identifier and store it in the searchable database much like is described with respect to step 230. The method 200 proceeds to step 280.

At step 280 the call center 20 can page a vehicle 12 based on the stored GMIN and the MEID. Using a GMIN and an MEID, the call center 20 can page the vehicle 12 and communicate with it even though the MIN/MDN has been erased or the wireless subscription service has been cancelled. For example, using the vehicle 12 located in Ohio, the call center 20 can decide it wants to contact that vehicle 12. In that case, the call center 20 can access the searchable database that it maintains and determine the GMIN of that vehicle 12. The call center 20 can then send a page to the HLR of the 500-prefix number (e.g. the GMIN saved at the vehicle 12; in this case 500-000-0002) using the GMIN of that vehicle 12 along with the MEID of the vehicle 12. When the HLR servicing the GMIN saved at the vehicle 12 receives this query, it can page the vehicle 12 using the MEID received from the call center 20. This page can include a short-message system (SMS) shoulder-tap that instructs the vehicle 12 having the MEID to contact the call center 20 using the GMIN. Only the telematics unit 30 having the MEID included in the page can respond, while other vehicles that receive the page, but have different MEIDs, can be programmed to just ignore the page. So, when that vehicle 12 receives the MEID page, it can then use the 500-prefix number to contact the call center 20. The method 200 then ends.

While the foregoing has been described in terms of CDMA cellular technologies, it is also equally feasible to carry out the above disclosure using other technologies, such as GSM and WCDMA. In the GSM or WCDMA technologies, many of the different identifiers used above have corresponding identifiers in the other types of cellular systems. For instance, the MDN can be represented with the Mobile Subscriber ISDN Number (MSISDN), the MIN can be represented with the International Mobile Subscriber Identity (IMSI), the GMIN may become the GIMSI, the MEID can be the International Mobile Equipment Identity (IMEI), and the SID-NID pair can be represented by the Location Area Identification (LAI). The use of the above system and methods in GMS, WCDMA, and other cellular systems will become apparent to those skilled in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, at steps 250 and 260, rather than contacting the call center for a new GMIN each time the vehicle moves to a new geographical region (e.g. from Michigan to Ohio), the telematics unit 30 can be pre-programmed with the different GMINs for the different SIDs or NIDs so that the assignment of a new GMIN can be done automatically at the vehicle without contacting the call center. This new assignment can be reported by the vehicle to the call center for subsequent paging or the call center can be programmed to page different GMINs until the vehicle responds. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle telematics unit, comprising the steps of:
   (a) replacing a mobile identification number (MIN) or a mobile dialed number (MDN) stored in a telematics unit with a temporary geographical mobile identification number (GMIN) that prevents the telematics unit from using all of its features;
   (b) associating the GMIN with a plurality of vehicles and a mobile equipment identification number (MEID) of the telematics device;
   (c) storing the associated GMIN and MEID at a central facility;
   (d) paging the telematics unit using the associated GMIN and MEID; and
   (e) instructing the telematics unit via the page to communicate with the central facility over a wireless data connection.

2. The method of claim 1, further comprising the steps of: determining that the vehicle has moved outside of a geographical area serviced by the GMIN; and replacing the GMIN with a new GMIN based on the location of the vehicle.

3. The method of claim 2, wherein the location of the vehicle is determined based on a system identification code (SID) or a network identification code (NID).

4. The method of claim 2, wherein the location of the vehicle is determined based on global positioning system (GPS) coordinates sent from the vehicle to the central facility.

5. The method of claim 2, wherein the location of the vehicle is determined based on a periodic update of the last known pointer provided by a home location register (HLR) or a visitor location register (VLR) that services the GMIN in the telematics unit.

6. The method of claim 1, wherein the GMIN is a 500-prefix number.

7. The method of claim 1, wherein the GMIN services a geographical area covering two or more area codes.

8. The method of claim 1, wherein replacing the MIN or MDN is carried out wirelessly from the central facility.

9. The method of claim 1, further comprising the step of instructing the telematics unit to communicate using a short-message service (SMS) shoulder tap sent by the central facility.

10. A method of operating a vehicle telematics unit, comprising the steps of:

(a) determining that a wireless communication service has not been renewed for a vehicle having a telematics unit;
(b) identifying the location of the vehicle;
(c) associating a temporary geographic mobile identification number (GMIN) having limited functionality with a plurality of vehicles and a mobile equipment identification number (MEID) of the telematics unit based on the location of the vehicle;
(d) storing the associated GMIN and MEID at a central facility;
(e) wirelessly transmitting the GMIN to the vehicle;
(f) programming the telematics unit with the GMIN; and
(g) contacting the telematics unit using the associated GMIN and MEID.

11. The method of claim 10, further comprising the steps of:
determining that the vehicle has moved outside of a geographical area serviced by the GMIN; and replacing the GMIN with a new GMIN based on the location of the vehicle.

12. The method of claim 11, wherein the location of the vehicle is determined based on a system identification code (SID) or a network identification code (NID).

13. The method of claim 11, wherein the location of the vehicle is determined based on global positioning system (GPS) coordinates sent from the vehicle to the central facility.

14. The method of claim 11, wherein the location of the vehicle is determined based on a periodic update of the last known pointer provided by a home location register (HLR) or a visitor location register (VLR) that services the GMIN programmed in the telematics unit.

15. The method of claim 10, wherein the GMIN is a 500-prefix number.

16. The method of claim 10, wherein the GMIN services a geographical area covering two or more area codes.

17. The method of claim 10, further comprising the step of instructing the telematics unit to communicate using a short-message service (SMS) shoulder tap sent by the central facility.

18. A method of operating a vehicle telematics unit, comprising the steps of:
(a) determining a system identification number (SID) or a network identification number (NID) of a wireless carrier system at the location of a vehicle that includes a telematics unit;
(b) selecting a temporary geographical mobile identification number (GMIN), a number associated with a plurality of vehicles, based on the SID or NID;
(c) replacing a mobile identification number (MIN) or mobile dialed number (MDN) of the telematics unit with the selected GMIN;
(d) associating the GMIN with a mobile equipment identification number (MEID) of the telematics unit;
(e) storing the associated GMIN and MEID at a central facility;
(f) if the vehicle detects that the SID or NID of the wireless carrier system at the location of the vehicle has changed, then:
(f1) establishing a data connection via the wireless carrier system between the vehicle and the central facility;
(f2) sending the SID or NID detected in step (f) to the central facility;
(f3) selecting a new GMIN based on the changed SID or NID sent to the central facility;
(f4) programming the telematics unit with the new GMIN;
(f5) associating the new GMIN with the MEID of the vehicle telematics unit; and
(f6) storing the associated new GMIN and MEID at the central facility.

19. The method of claim 18, wherein the GMIN is a 500-prefix number.

20. The method of claim 18, wherein the GMIN services a geographical area covering two or more area codes.

* * * * *